United States Patent
Dodd-Noble et al.

(10) Patent No.: US 11,452,020 B2
(45) Date of Patent: Sep. 20, 2022

(54) MAINTAINING INTERNET PROTOCOL ADDRESS FOR NETWORK TRAFFIC DURING HANDOVER PROCEDURE

(71) Applicant: Cisco Technology, Inc., San Jose, CA (US)

(72) Inventors: Aeneas Dodd-Noble, Andover, MA (US); Raghavendra Suryanarayanarao Vidyashankar, Bangalore South (IN); Om Prakash Suthar, Bolingbrook, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 9 days.

(21) Appl. No.: 16/518,140

(22) Filed: Jul. 22, 2019

(65) Prior Publication Data

US 2021/0029608 A1    Jan. 28, 2021

(51) Int. Cl.
*H04W 36/22*    (2009.01)
*H04W 36/00*    (2009.01)
*H04W 40/36*    (2009.01)
*H04W 8/26*    (2009.01)
*H04W 84/04*    (2009.01)

(52) U.S. Cl.
CPC ............ *H04W 36/22* (2013.01); *H04W 8/26* (2013.01); *H04W 36/0066* (2013.01); *H04W 40/36* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 10,462,653 B1 * | 10/2019 | Verma | H04L 63/1458 |
| 10,638,400 B1 * | 4/2020 | Xu | H04W 36/12 |
| 10,708,272 B1 * | 7/2020 | Holbrook | H04L 9/0643 |
| 11,051,192 B2 * | 6/2021 | Li | H04W 24/08 |

(Continued)

FOREIGN PATENT DOCUMENTS

EP    1850559 A1 * 10/2007    ........ H04L 29/12311

OTHER PUBLICATIONS

3GPP Organizational Partners, "3rd Generation Partnership Project; Technical Specification Group Services and System Aspects; Release 14 Description; Summary of Rel-14 Work Items (Release 14)", 3GPP TR 21.914 V14.0.0, May 2018, 103 pages.

(Continued)

*Primary Examiner* — Christopher T Wyllie
(74) *Attorney, Agent, or Firm* — Edell, Shapiro & Finnan, LLC

(57) ABSTRACT

In one example, a User Plane Function (UPF) in a Visited Public Land Mobile Network (V-PLMN) that includes a first network and a second network obtains network traffic from user equipment via the first network. The UPF provides the network traffic obtained via the first network to a data network with an Internet Protocol (IP) address allocated to the network traffic obtained from the user equipment. In response to a handover of the user equipment from the first network to the second network, the UPF obtains the network traffic from the user equipment via the second network. The UPF provides the network traffic obtained via the second network to the data network with the IP address.

20 Claims, 11 Drawing Sheets

(56) References Cited

U.S. PATENT DOCUMENTS

| | | | |
|---|---|---|---|
| 2007/0254661 A1* | 11/2007 | Chowdhury | H04W 36/02 455/436 |
| 2007/0297378 A1* | 12/2007 | Poyhonen | H04W 48/18 370/338 |
| 2012/0164979 A1* | 6/2012 | Bachmann | H04W 12/062 455/411 |
| 2014/0169286 A1* | 6/2014 | Xu | H04W 8/02 370/329 |
| 2016/0014833 A1* | 1/2016 | Nakamura | H04L 67/12 455/11.1 |
| 2016/0142944 A1* | 5/2016 | Cao | H04W 36/0022 455/436 |
| 2017/0099612 A1* | 4/2017 | Salot | H04W 40/02 |
| 2017/0142636 A1* | 5/2017 | Joshi | H04W 36/0011 |
| 2017/0150420 A1* | 5/2017 | Olsson | H04W 8/06 |
| 2017/0332421 A1* | 11/2017 | Sternberg | H04W 84/042 |
| 2017/0339609 A1* | 11/2017 | Youn | H04W 76/11 |
| 2018/0376384 A1* | 12/2018 | Youn | H04W 36/0022 |
| 2019/0116518 A1* | 4/2019 | Stojanovski | H04W 76/10 |
| 2019/0174405 A1* | 6/2019 | Yang | H04W 36/00835 |
| 2019/0357128 A1* | 11/2019 | Casati | H04W 60/00 |
| 2019/0394683 A1* | 12/2019 | Sillanpaa | H04W 60/04 |
| 2019/0394684 A1* | 12/2019 | Li | H04W 36/0033 |
| 2020/0053617 A1* | 2/2020 | Park | H04W 36/14 |
| 2020/0068449 A1* | 2/2020 | Jin | H04W 36/0022 |
| 2020/0106812 A1* | 4/2020 | Verma | H04L 63/0227 |

OTHER PUBLICATIONS

3GPP Organizational Partners, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.2.0, Mar. 2019, 418 pages.

3GPP Organizational Partners, "3rd Generation Partnership Project; Technical Specification Group Services and System Aspects; System Architecture for the 5G System; Stage 2 (Release 16)", 3GPP TS 23.501 V16.1.0, Jun. 2019, 368 pages.

3GPP Organizational Partners, "3rd Generation Partnership Project; Technical Specification Group Services and System Aspects; Procedures for the 5G System; Stage 2 (Release 16)", 3GPP TS 23.502 V16.1.1., Jun. 2019, 495 pages.

3GPP Organizational Partners, "3rd Generation Partnership Project; Technical Specification Group Services and System Aspects; Study on Enhancing Topology of SMF and UPF in 5G Networks (Release 16)", 3GPP TR 23.726 V16.0.0, Dec. 2018, 96 pages.

Peter Schmitt et al., "Control and User Plane Separation of EPC nodes (CUPS)", Jul. 3, 2017, https://www.3gpp.org/cups, 3 pages.

K. Bogineni et al., "Optimized Mobile User Plane Solutions for 5G", draft-bogineni-dmm-optimized-mobile-user-plane-01, Jun. 29, 2018, 65 pages.

Samsung, "4G-5G Interworking", RAN-level and CN-level Interworking, Jun. 2017, 17 pages.

Martin Sauter, "The 5G Core Network (5GC)—Part 3—Local Breakout", https://blog.wirelessmoves.com/2018/05/the-5g-core-network-5gc-part-3-local-breakout.html, May 4, 2018, 2 pages.

ETSI, "5G; 5G System; Interworking between 5G Network and external Data Networks; Stage 3", (3GPP TS 29.561 version 15.0.0 Release 15), ETSI TS 129 561 V15.0.0, Jul. 2018, 47 pages.

* cited by examiner

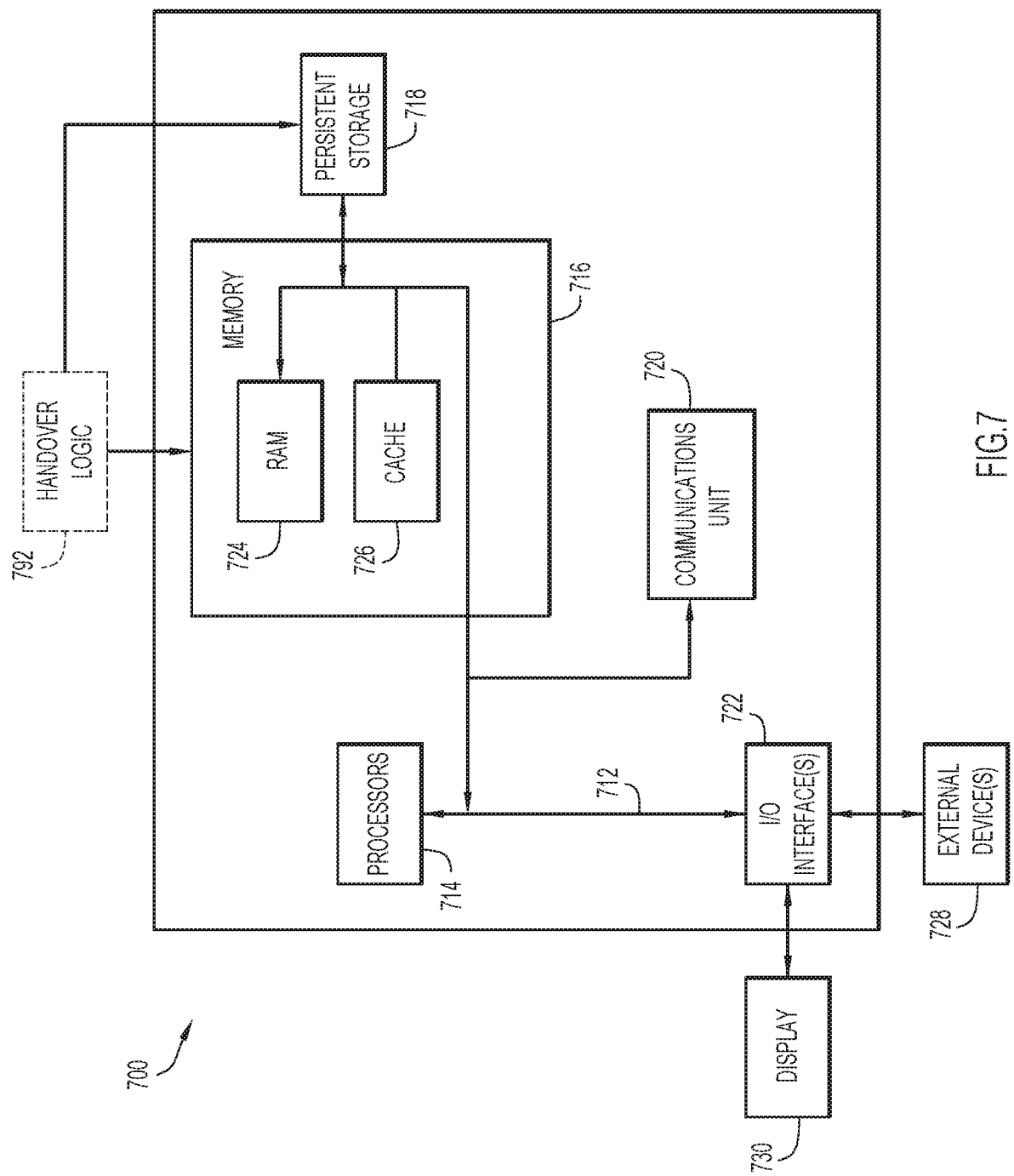

MAINTAINING INTERNET PROTOCOL ADDRESS FOR NETWORK TRAFFIC DURING HANDOVER PROCEDURE

TECHNICAL FIELD

The present disclosure relates to telecommunications technology.

BACKGROUND

Mobile subscribers typically access the Internet through a home network. When roaming, however, mobile subscribers instead access the Internet via a visited network. There are two main approaches for roaming mobile subscribers to access the Internet: home routing and local breakout. In home routing, the visited network sends network traffic from the mobile subscriber to the home network, which then provides the network traffic to the Internet. In local breakout, the visited network sends the network traffic directly to the Internet. Only local breakout permits a visited network to assign an Internet Protocol address to a User Equipment (UE).

BRIEF DESCRIPTION OF THE DRAWINGS

FIG. 7 illustrates a block diagram of a computing device configured to maintain an IP address for network traffic during a handover procedure, according to an example embodiment.

DESCRIPTION OF EXAMPLE EMBODIMENTS

Overview

In one example embodiment, a User Plane Function (UPF) in a Visited Public Land Mobile Network (V-PLMN) that includes a first network and a second network, obtains network traffic from user equipment via the first network. The UPF provides the network traffic obtained via the first network to a data network with an Internet Protocol (IP) address allocated to the network traffic obtained from the user equipment. In response to a handover of the user equipment from the first network to the second network, the UPF obtains the network traffic from the user equipment via the second network. The UPF provides the network traffic obtained via the second network to the data network with the IP address.

Example Embodiments

Figure 1:
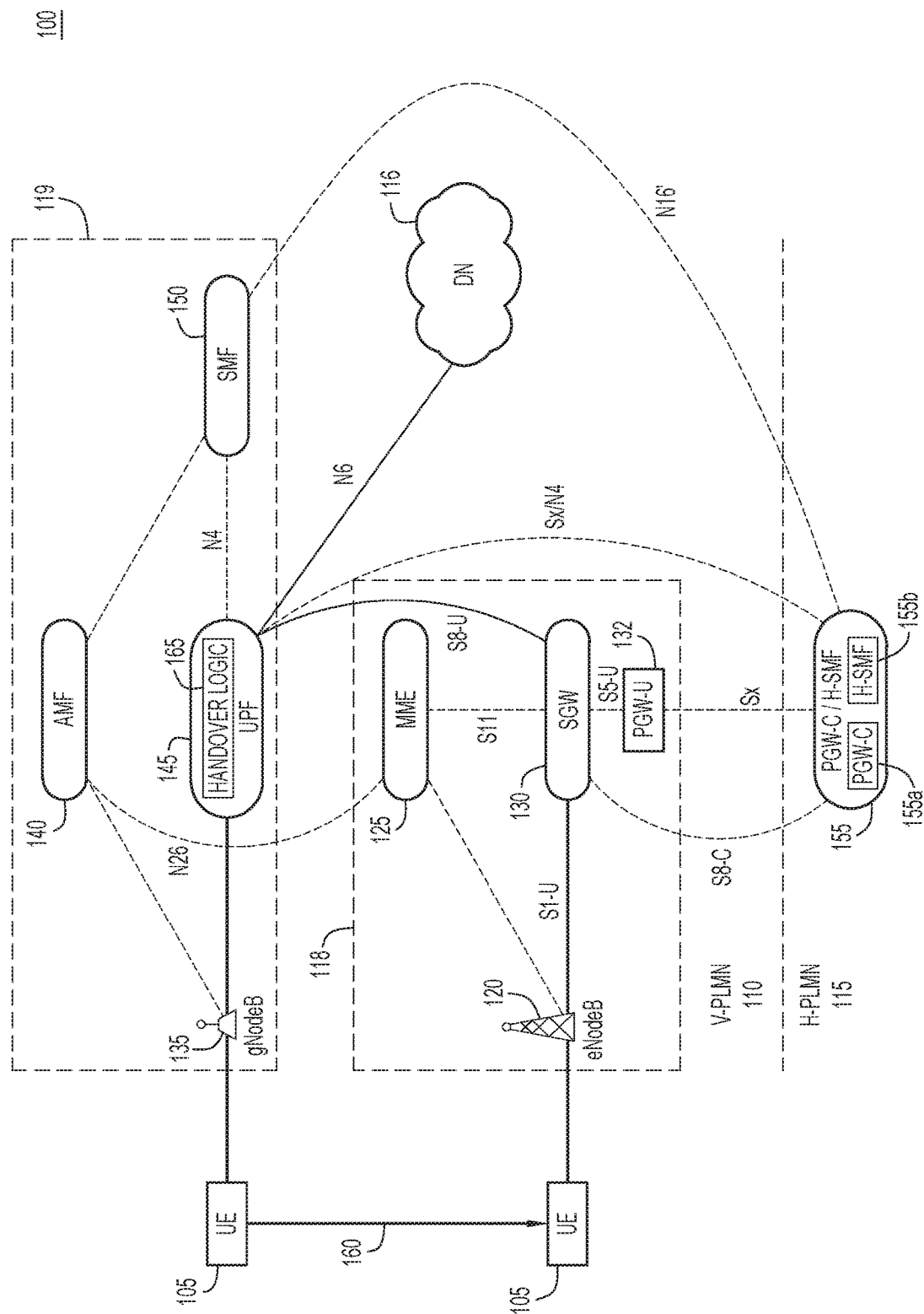
FIG. 1 illustrates a system configured to maintain an Internet Protocol (IP) address for network traffic during handover from a fifth generation network to a fourth generation network, according to an example embodiment.

FIG. 1 illustrates a system 100 configured to maintain an Internet Protocol (IP) address for network traffic during handover. System 100 includes User Equipment (UE) 105, Visited Public Land Mobile Network (V-PLMN) 110, and Home Public Land Mobile Network (H-PLMN) 115. UE 105 may be mobile equipment such as a phone, laptop, Internet of Things (IoT) device, etc. V-PLMN 110 and H-PLMN 115 may be located in different countries and managed by different mobile network operators.

V-PLMN 110 is configured to provide access to Data Network (DN) (e.g., Internet) 116 via both fourth generation network (e.g., 4G) 118 and fifth generation network (e.g., 5G) 119. To that end, V-PLMN 110 includes components of both fourth generation network 118 and fifth generation network 119. The components of fourth generation network 118 include eNodeB 120, Mobility Management Entity (MME) 125, Serving Gateway (SGW) 130, and Public DN (PDN) Gateway (PGW) User plane function (PGW-U) 132. eNodeB 120 is configured to communicate directly with UE 105. MME 125 is configured to control many aspects of fourth generation network 118. SGW 130 is configured to route and forward network traffic. SGW 130 is configured to communicate with eNodeB 120 over an S1-U interface, with MME 125 over an S11 interface, and with PGW-U 132 over an S5-U interface.

The components of fifth generation network 119 include gNodeB 135, Access and Mobility Management Function (AMF) 140, User Plane Function (UPF) 145, and Session Management Function (SMF) 150. gNodeB 135 is configured to communicate directly with UE 105. AMF 140 is configured to handle connection and mobility management tasks on behalf of UE 105. AMF 140 is configured to communicate with MME 125 over an N26 interface to handle mobility management messages when User Equipment UE 105 hands over between fifth generation network 119 and fourth generation network 118. UPF 145 is configured to terminate sessions, and may anchor both a fifth generation visited UPF and PGW-U 132. UPF 145 is configured to communicate with DN 116 over an N6 interface. SMF 150 is configured to manage sessions with UPF 145. SMF 150 is configured to communicate with UPF 145 over an N4 interface.

H-PLMN 115 includes PGW Control plane function/Home SMF (PGW-C/H-SMF) 155. PGW-C/H-SMF 155 includes functionality associated with PGW-C 155a and H-SMF 155b. PGW-C 155a is configured to select and manage one or more PGW-Us. In one example, H-PLMN 115 may be configured with PGW-U 132 anchored by UPF 145. H-SMF 155b is configured to perform similar operations as SMF 150, but for H-PLMN 115. PGW-C/H-SMF 155 is configured to communicate with SGW 130 over an S8-C interface, with PGW-U over an Sx interface, with UPF 145 over an Sx/N4 interface, and with SMF 150 over an N16' interface.

Initially, UE 105 is connected to gNodeB 135. In this example, fifth generation network 119 supports local break out in V-PLMN 110. For example, the UE subscriber profile in a Unified Data Repository (UDR) in V-PLMN 110 may allow for local break out. This may cause UPF 145 to anchor the Protocol Data Unit (PDU) session. As such, the UPF 145 obtains network traffic via gNodeB 135 and provides the network traffic to DN 116 with an IP address allocated to network traffic obtained from UE 105. Thus, the network traffic is sent directly to DN 116 in V-PLMN 110 instead of first being home-routed to H-PLMN 115.

At some later point in time, a handover procedure is initiated as UE 105 moves from gNodeB 135 (fifth generation network 119) to eNodeB 120 (fourth generation network 118), as represented by arrow 160. In this example, the fourth generation network 118 does not support local break out. This is often the case in fourth generation networks because there are no deployments of local break out in the Evolved Packet Core (EPC) and S9 interface, and as such the management of sessions in V-PLMNs is generally not considered viable.

Conventionally, when UE 105 hands over from gNodeB 135 to eNodeB 120, MME 125 would assign PGW-C/H-SMF 155 to the network traffic. That is, network traffic would be home-routed from eNodeB 120 to SGW 130 and then to PGW-C/H-SMF 155, and finally to a DN in H-PLMN 115. This process requires selection of a new UPF in H-PLMN 115, which would cause loss of the established PDU session in fifth generation network 119. This process would also prompt allocation of a new IP address to the network traffic obtained from UE 105 because the PDN of fourth generation network 118 is connected to a PGW-U in H-PLMN 115.

In cases where V-PLMN 110 and H-PLMN 115 are located in different administrative domains (e.g., countries), the new IP address would have different policies associated therewith. Due to the change in the IP address and the network to which UE 105 is connected, in many cases applications that use the locality of UE 105 (e.g., video subject to country-specific Digital Rights Management (DRM)) can fail, leading to a major disruption in user experience. Thus, conventionally, handover 160 would negatively impact or stop applications that restrict access to content based on IP address because of DRM and regulatory restrictions. Furthermore, MME 125 would not be able to select the PGW-C address of SMF 150 and would therefore need to re-establish the PDN, causing a disruption to any real-time services.

Accordingly, handover logic 165 is provided in UPF 145 to cause UPF 145 to perform operations described herein associated with avoiding disruptions in conventional handovers as described above. Briefly, in response to handover 160, UPF 145 may obtain the network traffic via eNodeB 120 (of fourth generation network 118), and provide the network traffic to DN 116 with the same IP address previously allocated to the network traffic obtained from UE 105. Thus, there is no change in the network or the IP address associated with the network traffic from UE 105. This seamless IP continuity may thereby minimize/eliminate disruptions to user applications caused by handover 160.

In one example, after handover 160, UPF 145 may obtain the network traffic from eNodeB 120 via SGW 130 and then provide the network traffic to DN 116 with the previously allocated IP address. SGW 130 may provide the network traffic to UPF 145 based on an indication obtained from PGW-C/H-SMF 155 to provide the network traffic to UPF 145.

In order to indicate that the network traffic is to be provided to UPF 145, PGW-C/H-SMF 155 may first obtain an identification of UPF 145. In one example, UPF 145 may provide an indication of the identification of UPF 145 to PGW-C/H-SMF 155 over the Sx/N4 interface. For instance, PGW-C/H-SMF 155 may retrieve the session state using the Sx/N4 interface extensions.

In another example, SMF 150 may provide the indication of the identification of UPF 145 to PGW-C/H-SMF 155 over the N16' interface. For instance, PGW-C/H-SMF 155 may use context retrieval procedures as specified in clause 5.34 of 3rd Generation Partnership Project (3GPP) Technical Specification (TS) 23.501, published June 2019. PGW-C/H-SMF 155 may, for example, use a method for Enhancing Topology of SMF and UPF in 5G Networks (ETSUN) to insert SMF 150.

In still another example, AMF 140 may provide the indication of the identification of UPF 145 to PGW-C/H-SMF 155. For instance, AMF 140 may provide the indication over the N26 interface to MME 125, which may provide the indication over the S11 interface to SGW 130, which in turn may provide the indication over the S8-C interface to PGW-C/H-SMF 155.

Figure 2A:
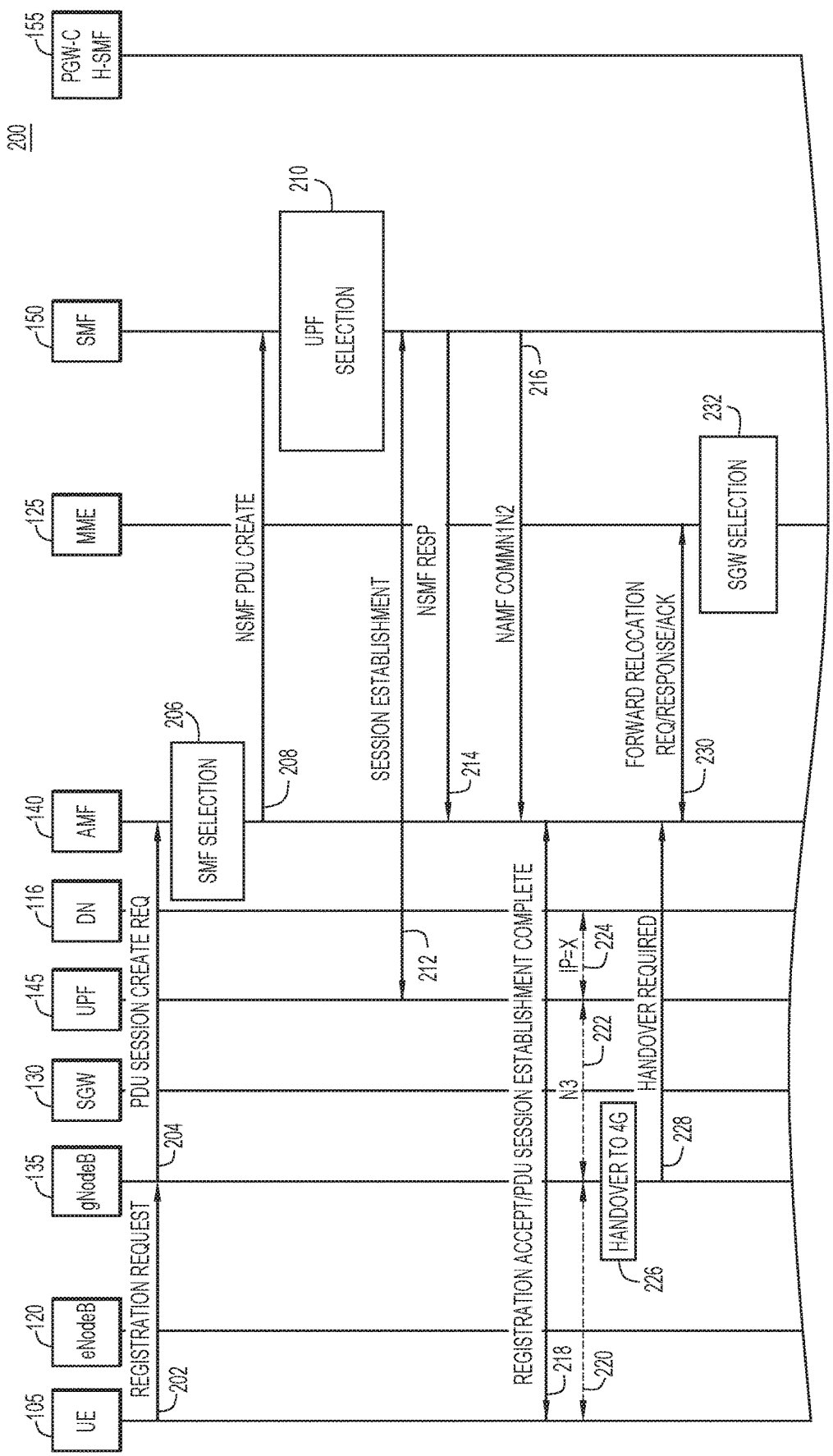
FIGS. 2A and 2B collectively illustrate a sequence diagram that shows operations performed by various entities in the system of FIG. 1, according to an example embodiment.
Figure 2B:
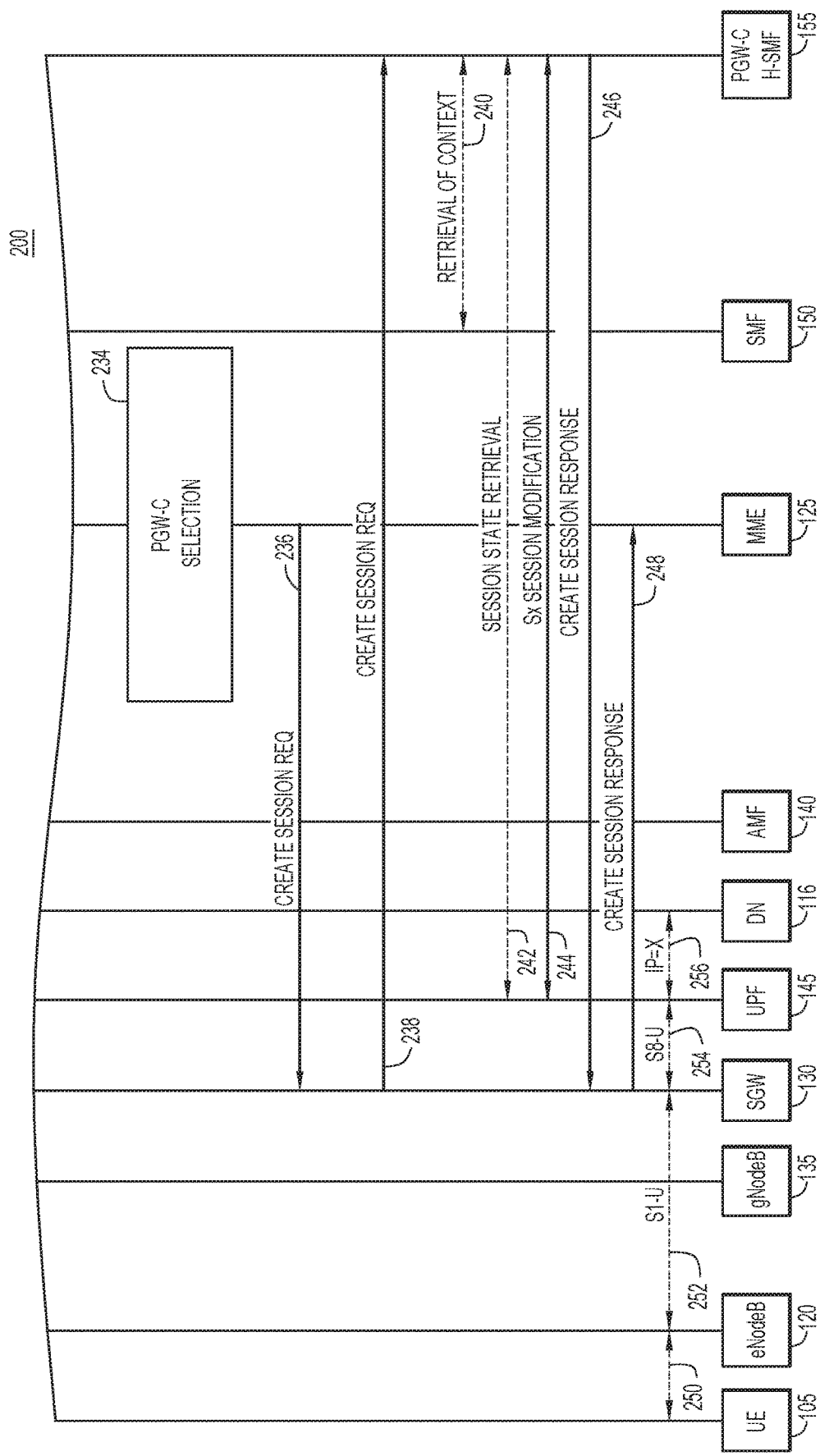

FIGS. 2A and 2B collectively illustrate sequence diagram 200, which shows operations performed by various entities in system 100. Briefly, sequence diagram 200 illustrates a method to transfer a PDN session from SMF 150 to PGW-C/H-SMF 155 while maintaining the PDU session anchored at UPF 145. Reference is also made to FIG. 1 for purposes of the description of FIG. 2. At 202, UE 105 sends a registration request to gNodeB 135. At 204, gNodeB 135 sends a PDU session create request to AMF 140. At 206, AMF 140 selects SMF 150 and, at 208, sends an Nsmf PDU create message to SMF 150. At 210, SMF 350 selects UPF 145 based on local break out policy and location and, at 212, establishes an N4 session with UPF 145. At 214, SMF 150 sends an Nsmf response message to AMF 140.

At 216, SMF 150 sends an Namf communication over an N1N2 interface to AMF 140. The Namf communication may include an identification of UPF 145. At 218, AMF 140 sends a registration accept to UE 105 and PDU session establishment is complete. At 220, network traffic is transmitted between UE 105 and gNodeB 135. At 222, the network traffic is transmitted between gNodeB 135 and UPF 145 over an N3 interface. At 224, the network traffic with a given IP address is transmitted between UPF 145 and DN 116.

At 226, gNodeB 135 initiates a handover procedure to fourth generation network 118. At 228, gNodeB 135 sends a message to AMF 140 indicating that handover is required. At 230, AMF 140 sends a forward relocation request to MME 125 identifying SMF 150 and UPF 145 as part of the inter-radio access technology handover procedure, and MME 125 returns a forward relocation response/acknowledgment. At 232, MME 125 selects SGW 130. At 234, in response to determining that local break out for fourth generation network 118 is restricted in V-PLMN 110, MME 125 selects PGW-C/H-SMF 155 based on local configuration and/or the identification of UPF 145.

At 236, MME 125 sends a handover request type create session request to SGW 130. At 238, SGW 130 sends the handover request type create session request with the identification of SMF 150 and UPF 145 to PGW-C/H-SMF 155. At 240, if the N16' interface is supported, PGW-C/H-SMF 155 retrieves the context from SMF 150. At 242, if the N16' interface is not supported, PGW-C/H-SMF 155 retrieves the session state including the PDN IP address from UPF 145 using extensions to interface Sx. At 244, UPF 145 and PGW-C/H-SMF 155 modify the Sx session.

At 246, PGW-C/H-SMF 155 sends a create session response including the identification of UPF 145 to SGW 130. At 248, SGW 130 sends a create session response including the identification of UPF 145 to MME 125. At 250, network traffic is transmitted between UE 105 and eNodeB 120. At 252, the network traffic is transmitted between eNodeB 120 and SGW 130 over the S1-U interface. At 254, the network traffic is transmitted between SGW 130 and UPF 145 over the S8-U interface. At 256, the network traffic with the same given IP address is transmitted between UPF 145 and DN 116.

Figure 3:
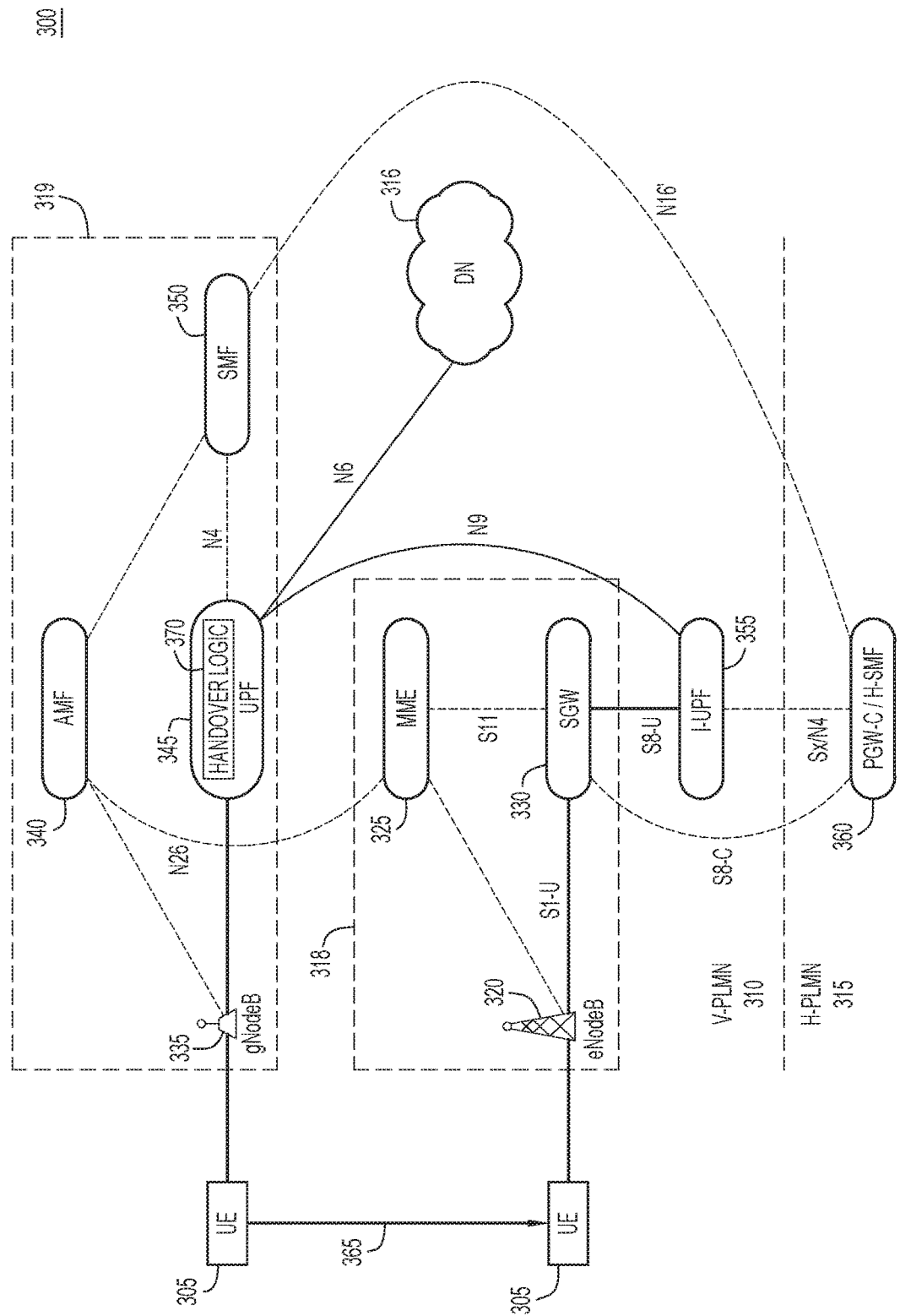
FIG. 3 illustrates another system configured to maintain an IP address for network traffic during handover from a fifth generation network to a fourth generation network, according to an example embodiment.

FIG. 3 illustrates system 300, which is configured to maintain an IP address for network traffic during handover. System 300 includes UE 305, V-PLMN 310, and H-PLMN 315. V-PLMN 310 is configured to provide access to DN 316 and includes fourth generation network 318 and fifth generation network 319. Fourth generation network 318 includes eNodeB 320, MME 325, and SGW 330. Fifth generation network 319 includes gNodeB 335, AMF 340, UPF 345, and SMF 350. UPF 345 includes handover logic 370 to enable UPF 345 to perform operations described herein. V-PLMN 310 also includes Intermediate UPF (I-UPF) 355, and H-PLMN 315 includes PGW-C/H-SMF 360. I-UPF 355 is configured to communicate with SGW 330 over the S8-U interface, with UPF 345 over the N9 interface, and with PGW-C/H-SMF 360 over the Sx/N4 interface.

Initially, UE 305 is connected to gNodeB 335. At some point, a handover procedure is initiated and UE 305 detaches from gNodeB 335 and reattaches to eNodeB 320, as represented at 365. MME 325 may select PGW-C/H-SMF 360 in a similar manner as described above in connection with FIGS. 1 and 2, but in this example PGW-C/H-SMF 360 may select I-UPF 355 autonomously instead of obtaining an indication of an identity of a specified UPF from V-PLMN 310. In one example, after handover 365, UPF 345 may obtain the network traffic from eNodeB 320 via SGW 330 and I-UPF 355, and then provide the network traffic to DN 316 with the previously allocated IP address.

SGW 330 may provide the network traffic to I-UPF 355 based on an indication obtained from PGW-C/H-SMF 360 to provide the network traffic to I-UPF 355. In one example, SMF 350 may transfer the context of the session to PGW-C/H-SMF 360 over the N16' interface. In a further example, PGW-C/H-SMF 360 may retrieve charging information and push policy rules from SMF 350 over the N16' interface. Although I-UPF 355 is located in V-PLMN 310, it will be appreciated that in other examples PGW-C/H-SMF 360 may select an I-UPF located in H-PLMN 315. Because I-UPF 355 and UPF 345 are configured to communicate over the N9 interface, UPF 345 need not transfer the session over the N4 interface. This allows the same IP address to be used for the network traffic even after handover 365.

Figure 4A:
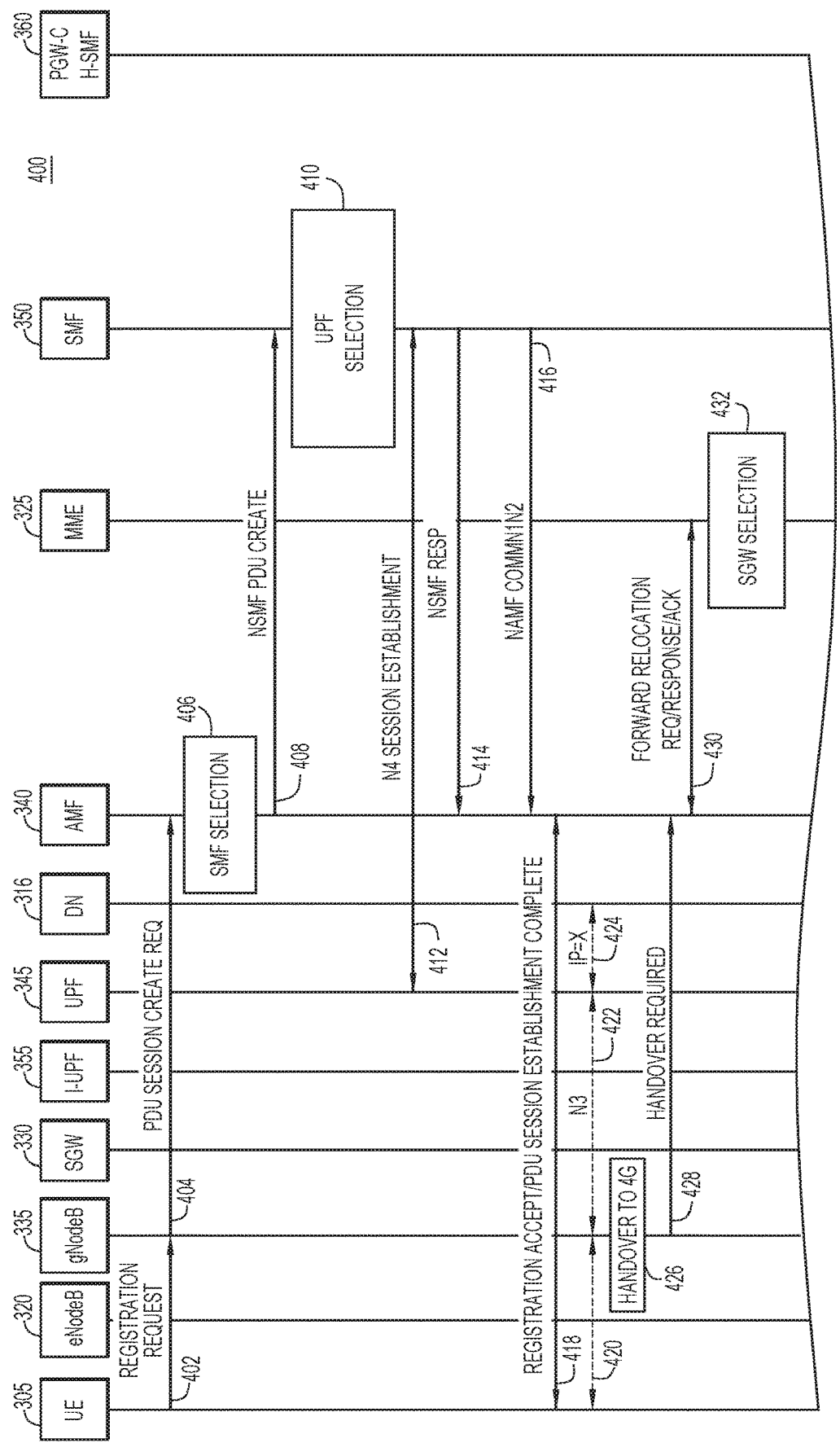
FIGS. 4A and 4B collectively illustrate a sequence diagram that shows operations performed by various entities in the system of FIG. 3, according to an example embodiment.
Figure 4B:
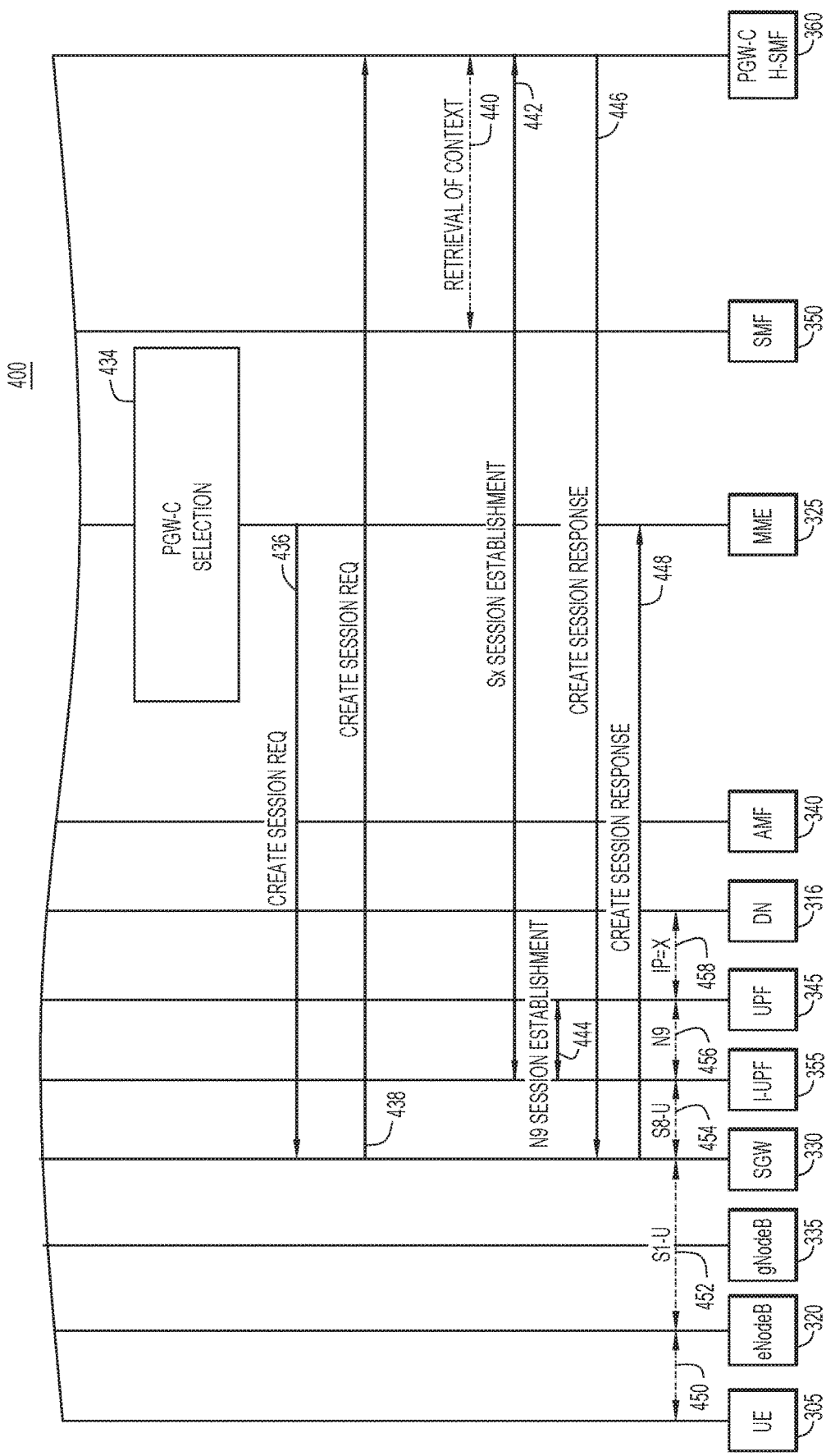

FIGS. 4A and 4B collectively illustrate sequence diagram 400, which shows operations performed by various entities in system 300. Briefly, sequence diagram 400 illustrates a method whereby PGW-C/H-SMF 360 selects I-UPF 355 for IP session continuity. At 402, UE 305 sends a registration request to gNodeB 335. At 404, gNodeB 335 sends a PDU session create request to AMF 340. At 406, AMF 340 selects SMF 350 and, at 408, sends an Nsmf PDU create message to SMF 350. At 410, SMF 350 selects UPF 345 based on local break out policy and location and, at 412, establishes an N4 session with UPF 345. At 414, SMF 350 sends an Nsmf response message to AMF 340.

At 416, SMF 350 sends an Namf communication over an N1N2 interface to AMF 340. The Namf communication may include an identification of UPF 345. At 418, AMF 340 sends a registration accept to UE 305 and PDU session establishment is complete. At 420, network traffic is transmitted between UE 305 and gNodeB 335. At 422, the network traffic is transmitted between gNodeB 335 and UPF 345 over the N3 interface. At 424, the network traffic with a given IP address is transmitted between UPF 345 and DN 316.

At 426, gNodeB 335 initiates a handover procedure to fourth generation network 318. At 428, gNodeB 335 sends a message to AMF 340 indicating that handover is required. At 430, AMF 340 sends a forward relocation request to MME 325 identifying SMF 350 and UPF 345 as part of the inter-radio access technology handover procedure, and MME 325 returns a forward relocation response/acknowledgment. At 432, MME 325 selects SGW 330. At 434, in response to determining that local break out for the fourth generation network 318 is restricted in V-PLMN 310, MME 325 selects PGW-C/H-SMF 360 based on local configuration and/or the identification of UPF 345.

At 436, MME 325 sends a handover request type create session request to SGW 330. At 438, SGW 330 sends the handover request type create session request with the identification of SMF 350 and UPF 345 to PGW-C/H-SMF 360. At 440, if the N16' interface is supported, PGW-C/H-SMF 360 retrieves PDN context policy and charging information from SMF 350. At 442, if the N16' interface is not supported, PGW-C/H-SMF 360 establishes an Sx session without transfer of contexts between UPF 345 and I-UPF 355. At 444, UPF 345 and I-UPF 355 establish an N9 session.

At 446, PGW-C/H-SMF 360 sends a create session response including the identification of I-UPF 355 to SGW 330. At 448, SGW 330 sends a create session response including the identification of I-UPF 355 to MME 325. At 450, network traffic is transmitted between UE 305 and eNodeB 320. At 452, the network traffic is transmitted between eNodeB 320 and SGW 330 over the S1-U interface. At 454, the network traffic is transmitted between SGW 330 and I-UPF 355 over the S8-U interface. At 456, the network traffic is transmitted between I-UPF 355 and UPF 345 over the N9 interface. At 458, the network traffic with the same given IP address is transmitted between UPF 345 and DN 316.

Figure 5:
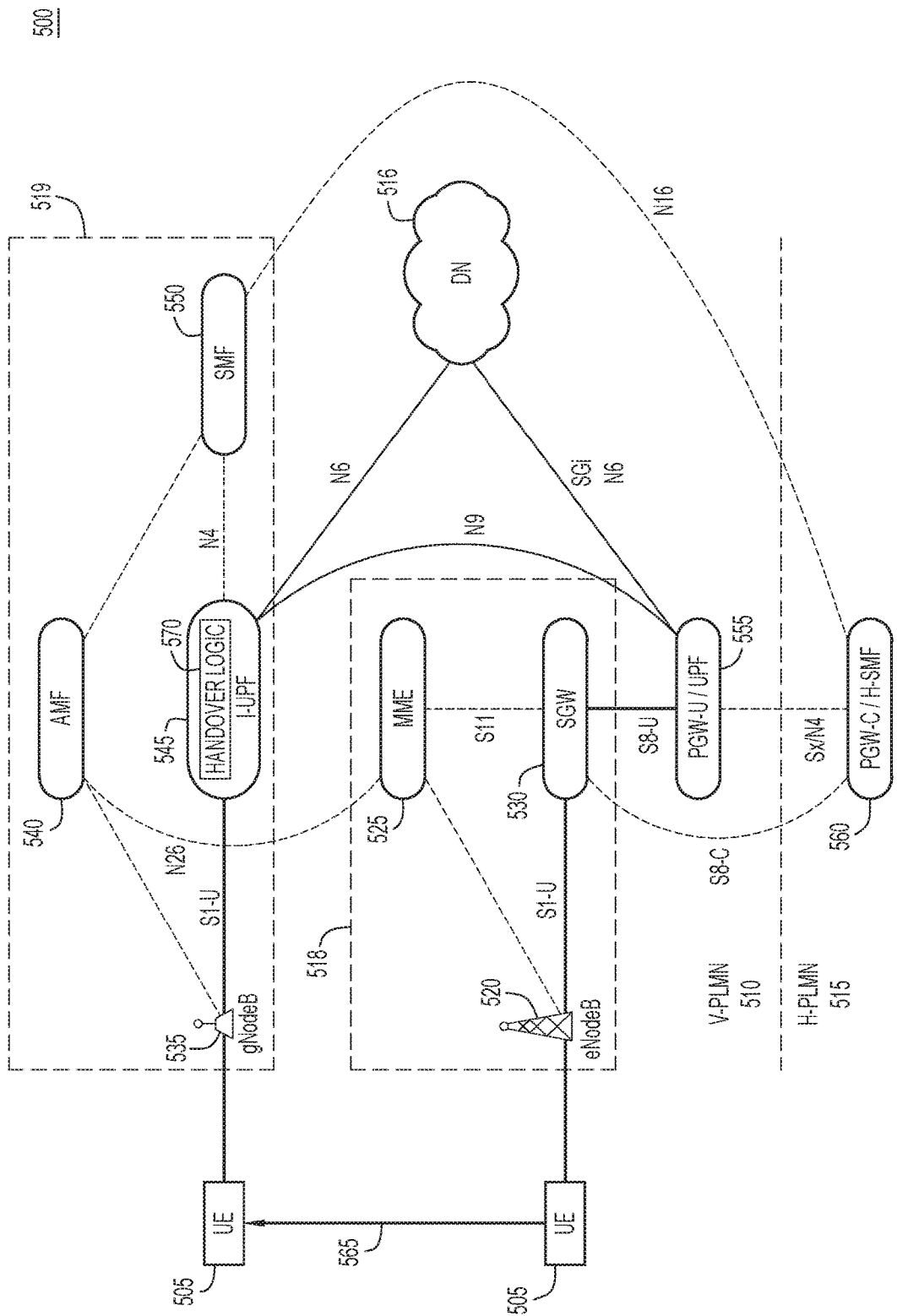
FIG. 5 illustrates a system configured to maintain an IP address for network traffic during handover from a fourth generation network to a fifth generation network, according to an example embodiment.

FIG. 5 illustrates system 500, which is configured to maintain an IP address for network traffic during handover. System 500 includes UE 505, V-PLMN 510, and H-PLMN 515. V-PLMN 510 is configured to provide access to DN 516 and includes fourth generation network 518 and fifth generation network 519. Fourth generation network 518 includes eNodeB 520, MME 525, and SGW 530. Fifth generation network 519 gNodeB 535, AMF 540, I-UPF 545, and SMF 550. I-UPF 545 includes handover logic 570 to enable I-UPF 545 to perform operations described herein. V-PLMN 510 also includes PGW-U/UPF 555, and H-PLMN 515 includes PGW-C/H-SMF 560. I-UPF 545 is configured to communicate with gNodeB 535 over the S1-U interface, with DN 516 over the N6 interface, and with PGW-U/UPF 555 over the N9 interface. PGW-U/UPF 555 is configured to communicate with DN 516 over the SGi N6 interface. PGW-C/H-SMF 560 is configured to communicate with SMF 550 over the N16 interface.

Unlike systems 100 and 300, which dealt with handover from fifth generation networks 119 and 319 to fourth generation networks 118 and 318, system 500 addresses handover from fourth generation network 518 to fifth generation network 519. In this example, local break out is suppressed for the relevant PDU/PDN. Initially, UE 505 is connected to eNodeB 520, and PGW-U/UPF 555 is configured to obtain network traffic from UE 505 via eNodeB 520 and provide the network traffic to DN 516. At some point, a handover procedure is initiated and UE 505 detaches from eNodeB 520 and reattaches to gNodeB 535, as represented by arrow 565. I-UPF 545 may obtain, from SMF 550, an indication to establish a session with PGW-U/UPF 555. In one example, SMF 550 may select I-UPF 545 based on information obtained from PGW-C/H-SMF 560. I-UPF 545 may establish a session with PGW-U/UPF 555 over the N9 interface, obtain the network traffic from gNodeB 535, and provide the network traffic to DN 516 with the same IP address as used by PGW-U/UPF 555. This provides the benefits of local break out without the complexity of the managing a session in V-PLMN 510 (e.g., charging and debugging). In a further example, I-UPF 545 may breakout specific traffic at the edge using the N16 interface.

Figure 6A:
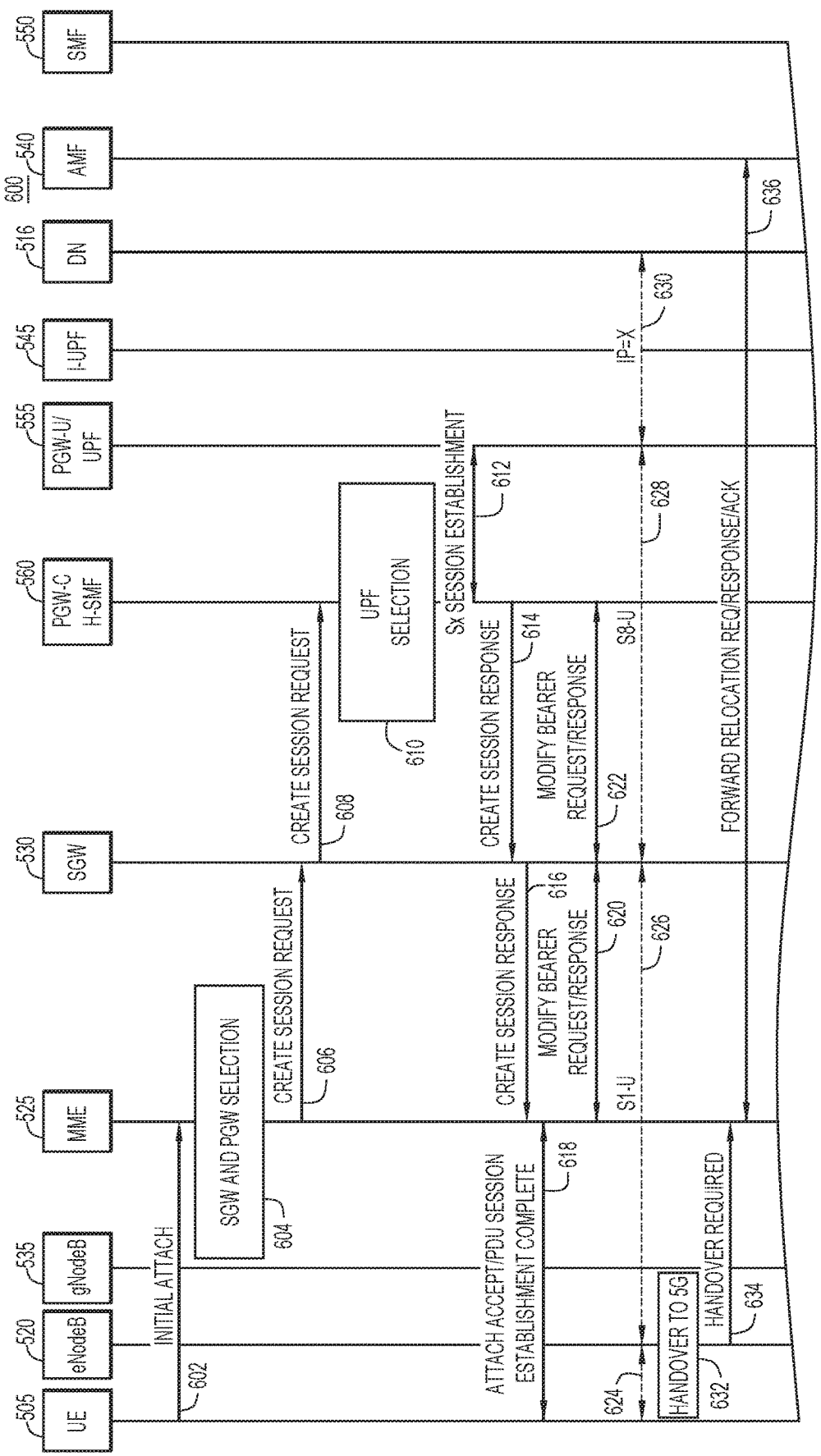
FIGS. 6A and 6B collectively illustrate a sequence diagram that shows operations performed by various entities in the system of FIG. 5, according to an example embodiment.
Figure 6B:
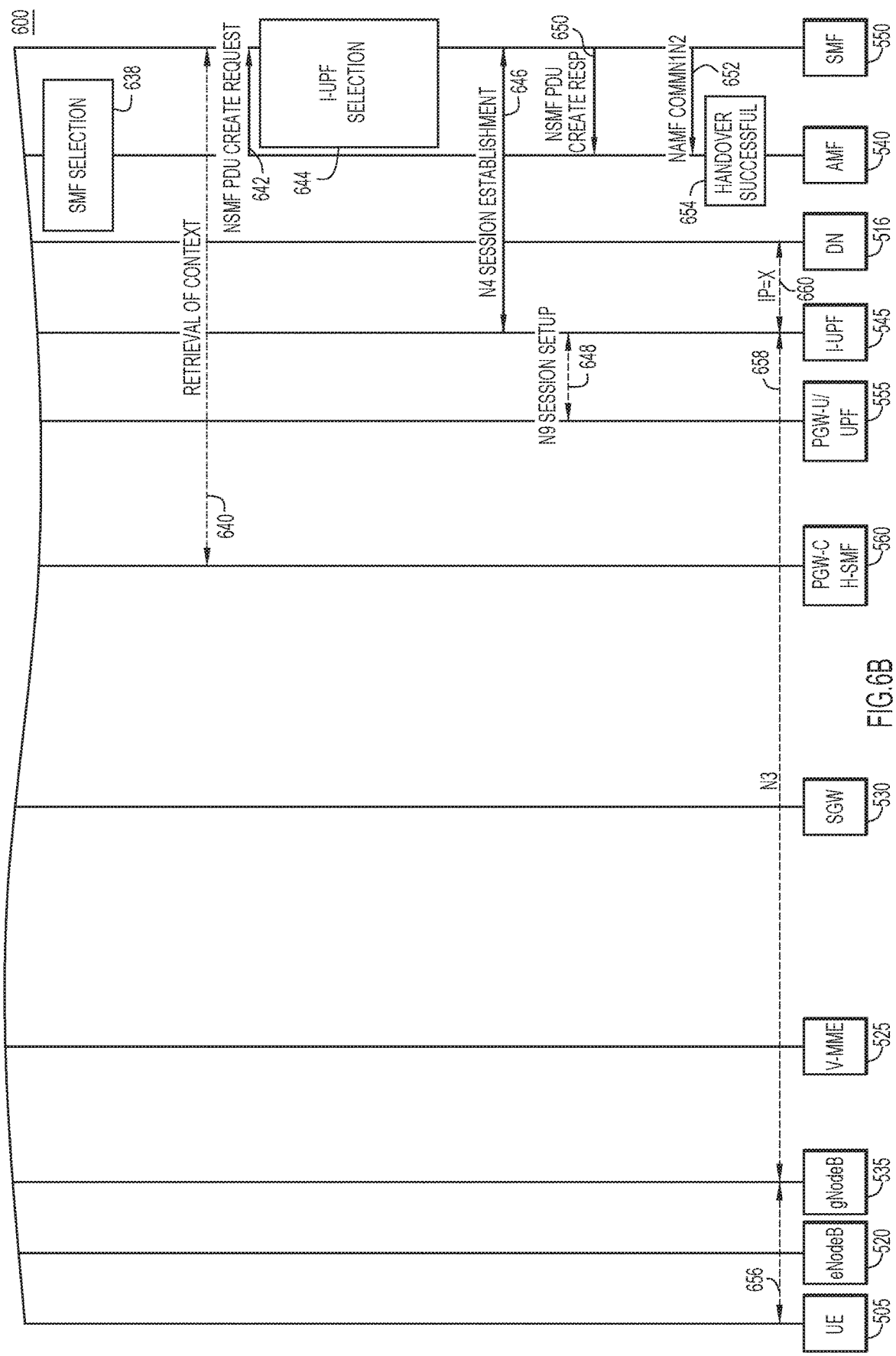

FIGS. 6A and 6B collectively illustrate sequence diagram 600, which shows operations performed by various entities in system 500. Briefly, sequence diagram 600 illustrates a method whereby I-UPF 545 breaks out specific traffic at the edge to enable IP session continuity. At 602, UE 505 sends an initial attach message with a default PDN connection request to MME 525. At 604, MME 525 selects SGW 530 and PGW-C/H-SMF 560. At 606, MME 525 sends a create session request to SGW 530. At 608, SGW 530 sends the create session request to PGW-C/H-SMF 560. At 610, based on local break out policy and location, PGW-C/H-SMF 560 selects PGW-U/UPF 555. At 612, PGW-C/H-SMF 560 and PGW-U/UPF 555 establish an Sx session.

At 614, PGW-C/H-SMF 560 sends a create session response to SGW 530. At 616, SGW 530 sends the create session response to MME 525. At 618, MME 525 sends an attach accept message to UE 505 and PDU session establishment is complete. At 620 and 622, MME 525 and PGW-C/H-SMF 560 exchange a modify bearer request and response via SGW 530. At 624, network traffic is transmitted between UE 505 and eNodeB 520. At 626, the network traffic is transmitted between eNodeB 520 and SGW 530 over the S1-U interface. At 628, the network traffic is transmitted between SGW 530 and PGW-U/UPF 555 over the S8-U interface. At 630, the network traffic with a given IP address is transmitted between PGW-U/UPF 555 and DN 516.

At 632, eNodeB 520 initiates a handover procedure to fifth generation network 519. At 634, eNodeB 520 sends a message to MME 525 indicating that handover is required. At 636, MME 525 sends a forward relocation request to AMF 540 identifying PGW-C/H-SMF 560 and UPF 555 as part of the inter-radio access technology handover procedure over the N26 interface, and AMF 540 returns a forward relocation response/acknowledgment. At 638, AMF 540 selects SMF 550. At 640, SMF 550 retrieves context policy and charging information from PGW-C/H-SMF 560.

At 642, AMF 540 sends an Nsmf PDU create request to SMF 550. At 644, SMF 550 selects I-UPF 545 based on local break out policy and location. At 646, I-UPF 545 and SMF 550 establish an N4 session to allow for breakout of specific network traffic at the edge. At 648, I-UPF 545 and PGW-U/UPF 555 establish an N9 session. At 650, SMF 550 sends an Nsmf PDU create response to AMF 540. At 652, SMF 550 sends an Namf communication over an N1N2 interface to AMF 540. The Namf communication may include an identification of I-UPF 545. At 654, AMF 540 determines that the handover procedure was successful. At 656, network traffic is transmitted between UE 505 and gNodeB 535. At 658, the network traffic is transmitted between gNodeB 535 and I-UPF 545 over the N3 interface.

At 660, the network traffic with the same given IP address is transmitted between I-UPF 545 and DN 516.

FIG. 7 illustrates a hardware block diagram of a computing device 700 that may perform the functions of any of the servers or computing or control entities referred to herein in connection with maintaining an IP address for network traffic during a handover procedure. It should be appreciated that FIG. 7 provides only an illustration of one embodiment and does not imply any limitations with regard to the environments in which different embodiments may be implemented. Many modifications to the depicted environment may be made.

As depicted, the device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes Random Access Memory (RAM) 724 and cache memory 726. In general, memory 716 can include any suitable volatile or non-volatile computer readable storage media. Instructions for handover logic 792 may be stored in memory 716 or persistent storage 718 for execution by processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, Read-Only Memory (ROM), Erasable Programmable Read-Only Memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

Figure 8:
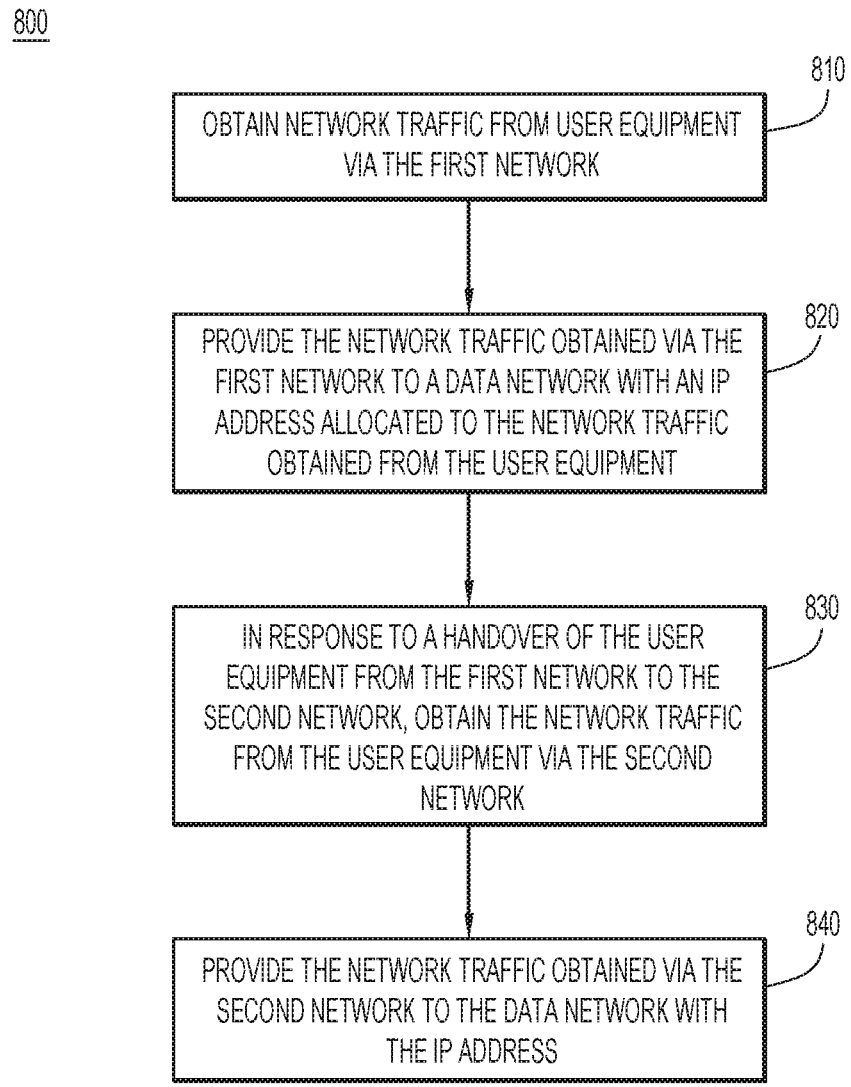
FIG. 8 illustrates a flowchart of a method for maintaining an IP address for network traffic during a handover procedure, according to an example embodiment.

FIG. 8 is a flowchart of method 800 for maintaining an IP address for network traffic during a handover procedure. Method 800 may be performed by a UPF in a V-PLMN that includes a first (e.g., fifth generation) network and a second (e.g., fourth generation) network (e.g., UPF 145, UPF 345, or I-UPF 545). At 810, the UPF obtains network traffic from user equipment via the first network. At 820, the UPF provides the network traffic obtained via the first network to a data network with an IP address allocated to the network traffic obtained from the user equipment. At 830, in response to a handover of the user equipment from the first network to the second network, the UPF obtains the network traffic from the user equipment via the second network. At 840, the UPF provides the network traffic obtained via the second network to the data network with the IP address.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: at a user plane function in a visited public land mobile network that includes a first network and a second network: obtaining network traffic from user equipment via the first network; providing the network traffic obtained via the first network to a data network with an Internet Protocol (IP) address allocated to the network traffic obtained from the user equipment; in response to a handover of the user equipment from the first network to the second network, obtaining the network traffic from the user equipment via the second network; and providing the network traffic obtained via the second network to the data network with the IP address.

In one example, obtaining the network traffic via the second network includes: obtaining the network traffic from a serving gateway in the visited public land mobile network, wherein the serving gateway obtains, from a home public land mobile network, an indication to provide the network traffic to the user plane function. In a further example, the method further comprises: at the user plane function: providing an identification of the user plane function to the home public land mobile network. In another further example, an identification of the user plane function is provided to the home public land mobile network from a session management function in the visited public land mobile network. In yet another further example, an identification of the user plane function is provided to the home public land mobile network from an access and mobility management function in the visited public land mobile network.

In another example, obtaining the network traffic via the second network includes: obtaining the network traffic from a serving gateway in the visited public land mobile network via an intermediate user plane function selected by a home public land mobile network, wherein the serving gateway obtains, from the home public land mobile network, an indication to provide the network traffic to the intermediate user plane function.

In yet another example, the method further comprises: at the user plane function: in response to a handover of the user equipment from the second network to the first network, obtaining, from a session management function in the visited public land mobile network, an indication to establish a session with another user plane function in the visited public land mobile network, wherein the other user plane function obtains the network traffic via the second network and provides the network traffic to the data network with the IP address; establishing the session with the other user plane function; obtaining the network traffic from the user equipment via the first network; and providing the network traffic obtained via the first network to the data network with the IP address.

In another form, an apparatus is provided. The apparatus comprises: a network interface configured to provide/obtain network traffic to/from user equipment; and one or more processors of a user plane function in a visited public land mobile network that includes a first network and a second network, wherein the one or more processors are coupled to the network interface and are configured to: obtain the network traffic from the user equipment via the first network; provide the network traffic obtained via the first network to a data network with an Internet Protocol (IP) address allocated to the network traffic obtained from the user equipment; in response to a handover of the user equipment from the first network to the second network, obtain the network traffic from the user equipment via the second network; and provide the network traffic obtained via the second network to the data network with the IP address.

In another form, one or more non-transitory computer readable storage media are provided. The one or more non-transitory computer readable storage media are encoded with instructions that, when executed by a processor of a user plane function in a visited public land mobile network that includes a first network and a second network, cause the processor to: obtain network traffic from user equipment via the first network; provide the network traffic obtained via the first network to a data network with an Internet Protocol (IP) address allocated to the network traffic obtained from the user equipment; in response to a handover of the user equipment from the first network to the second network, obtain the network traffic from the user equipment via the second network; and provide the network traffic obtained via the second network to the data network with the IP address.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a user plane function in a visited public land mobile network that includes a first network and a second network, wherein the user plane function is in the first network:
        obtaining network traffic from user equipment via the first network;
        providing the network traffic obtained via the first network to a data network with an Internet Protocol (IP) address allocated to the network traffic obtained from the user equipment;
        in response to a handover of the user equipment from the first network to the second network, obtaining the network traffic from the user equipment via the second network from a serving gateway in the second network of the visited public land mobile network via an intermediate user plane function located in and selected by a home public land mobile network; and
        providing the network traffic obtained via the second network to the data network with the IP address.

2. The method of claim 1, wherein the serving gateway obtains, from the home public land mobile network, an indication to provide the network traffic to the user plane function.

3. The method of claim 2, further comprising:
    at the user plane function:
        providing an identification of the user plane function to the home public land mobile network.

4. The method of claim 2, wherein an identification of the user plane function is provided to the home public land mobile network from a session management function in the visited public land mobile network.

5. The method of claim 2, wherein an identification of the user plane function is provided to the home public land mobile network from an access and mobility management function in the visited public land mobile network.

6. The method of claim 1, wherein the serving gateway obtains, from the home public land mobile network, an indication to provide the network traffic to the intermediate user plane function.

7. The method of claim 1, further comprising:
    at the user plane function:
        in response to a handover of the user equipment from the second network to the first network, obtaining, from a session management function in the visited public land mobile network, an indication to establish a session with another user plane function in the visited public land mobile network, wherein the other user plane function obtains the network traffic via the second network and provides the network traffic to the data network with the IP address;

establishing the session with the other user plane function;

obtaining the network traffic from the user equipment via the first network; and providing the network traffic obtained via the first network to the data network with the IP address.

8. The method of claim 1, wherein the first network is a fifth generation network and the second network is a fourth generation network.

9. An apparatus comprising:

a network interface configured to provide/obtain network traffic to/from user equipment; and one or more processors of a user plane function in a visited public land mobile network that includes a first network and a second network, wherein the user plane function is in the first network, wherein the one or more processors are coupled to the network interface and are configured to:

obtain the network traffic from the user equipment via the first network;

provide the network traffic obtained via the first network to a data network with an Internet Protocol (IP) address allocated to the network traffic obtained from the user equipment;

in response to a handover of the user equipment from the first network to the second network, obtain the network traffic from the user equipment via the second network from a serving gateway in the second network of the visited public land mobile network via an intermediate user plane function located in and selected by a home public land mobile network; and provide the network traffic obtained via the second network to the data network with the IP address.

10. The apparatus of claim 9, wherein the serving gateway obtains, from the home public land mobile network, an indication to provide the network traffic to the user plane function.

11. The apparatus of claim 10, wherein the one or more processors are further configured to:

provide an identification of the user plane function to the home public land mobile network.

12. The apparatus of claim 10, wherein an identification of the user plane function is provided to the home public land mobile network from a session management function in the visited public land mobile network.

13. The apparatus of claim 10, wherein an identification of the user plane function is provided to the home public land mobile network from an access and mobility management function in the visited public land mobile network.

14. The apparatus of claim 9, wherein the serving gateway obtains, from the home public land mobile network, an indication to provide the network traffic to the intermediate user plane function.

15. The apparatus of claim 9, wherein the one or more processors are further configured to:

in response to a handover of the user equipment from the second network to the first network, obtain, from a session management function in the visited public land mobile network, an indication to establish a session with another user plane function in the visited public land mobile network, wherein the other user plane function obtains the network traffic via the second network and provides the network traffic to the data network with the IP address;

establish the session with the other user plane function;

obtain the network traffic from the user equipment via the first network; and provide the network traffic obtained via the first network to the data network with the IP address.

16. The apparatus of claim 9, wherein the first network is a fifth generation network and the second network is a fourth generation network.

17. One or more non-transitory computer readable storage media encoded with instructions that, when executed by a processor of a user plane function in a visited public land mobile network that includes a first network and a second network, wherein the user plane function is in the first network, cause the processor to:

obtain network traffic from user equipment via the first network;

provide the network traffic obtained via the first network to a data network with an Internet Protocol (IP) address allocated to the network traffic obtained from the user equipment;

in response to a handover of the user equipment from the first network to the second network, obtain the network traffic from the user equipment via the second network from a serving gateway in the second network of the visited public land mobile network via an intermediate user plane function located in and selected by a home public land mobile network; and provide the network traffic obtained via the second network to the data network with the IP address.

18. The one or more non-transitory computer readable storage media of claim 17, wherein the serving gateway obtains, from the home public land mobile network, an indication to provide the network traffic to the user plane function.

19. The one or more non-transitory computer readable storage media of claim 17, wherein the serving gateway obtains, from the home public land mobile network, an indication to provide the network traffic to the intermediate user plane function.

20. The one or more non-transitory computer readable storage media of claim 17, wherein the instructions further cause the processor to:

in response to a handover of the user equipment from the second network to the first network, obtain, from a session management function in the visited public land mobile network, an indication to establish a session with another user plane function in the visited public land mobile network, wherein the other user plane function obtains the network traffic via the second network and provides the network traffic to the data network with the IP address;

establish the session with the other user plane function;

obtain the network traffic from the user equipment via the first network; and provide the network traffic obtained via the first network to the data network with the IP address.

* * * * *